Oct. 26, 1971  R. C. PEABODY  3,614,801
ROTARY TUBULAR BRUSH
Filed April 22, 1970  3 Sheets-Sheet 1

INVENTOR.
RALPH C. PEABODY
BY
Dugger Peterson Johnson & Westman
ATTORNEYS

INVENTOR.
RALPH C. PEABODY
BY
*Dugger Peterson Johnson & Westman*
ATTORNEYS

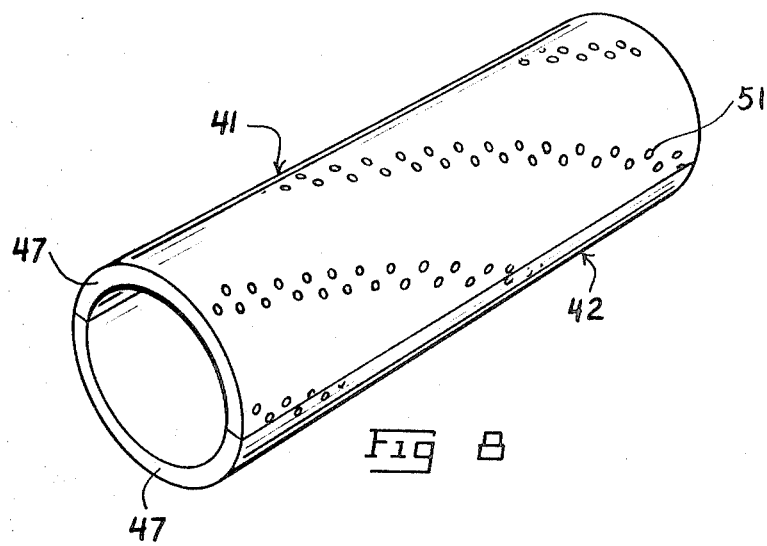
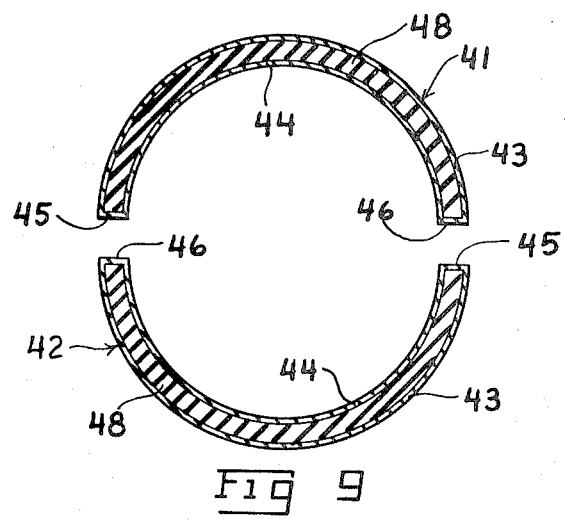
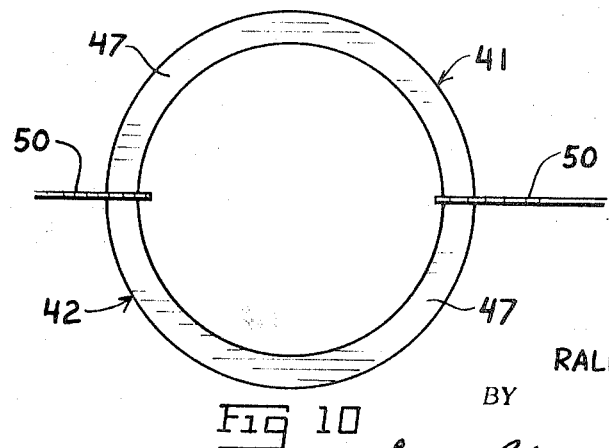

United States Patent Office 3,614,801
Patented Oct. 26, 1971

3,614,801
ROTARY TUBULAR BRUSH
Ralph C. Peabody, Minneapolis, Minn., assignor to
Tennant Company
Filed Apr. 22, 1970, Ser. No. 30,685
Int. Cl. A46b 13/02
U.S. Cl. 15—179                             15 Claims

ABSTRACT OF THE DISCLOSURE

A tubular brush having a tube made of a foamed plastic material that has outer and inner skins of substantial thicknesses and a central foam layer, a plurality of tuft holes extending through the outer skin and at least substantially through the central layer and tufts secured in the holes by staples extending at least a substantial distance into the inner skin. The inner and outer skins are of the same material as the central layer, although the density thereof is substantially greater than that of the central layer. Also disclosed are tubular brushes having interlocking portions and brush tubes having split tubular sections joined together to form a tube.

BACKGROUND OF THE INVENTION

Tubular brushes having a foam plastic tube and tufts stapled in holes in the tube.

In the prior art, tubular brushes, for example such as disclosed in U.S. Pat. 2,879,534, have tufts mounted in tubes made of a plurality of plies of wound paper impregnated with a hardening agent. Even though such impregnated paper brushes have served quite satisfactory, they are relatively dimensionally unstable, have a relatively high manufacturing cost and have other disadvantages. In order to overcome problems such as mentioned above, as well as others, this invention has been made.

SUMMARY OF THE INVENTION

A tubular brush having a tube made of a foamed plastic material that has inner and outer skins of substantially higher densities than the central layer, holes extending through the outer skin and at least substantially through the central layer and tufts secured in said holes by staples extending at least partially through the inner skin.

One of the objects of this invention is to provide a new and novel tubular brush for power driven floor, dock, roadway and the like maintenance machines for sweeping, polishing, scrubbing, scarifing and the like operations. In furtherance of the above mentioned object, it is another object of this invention to provide a tubular brush for heavy duty work that is comparatively dimensionally stable and that can be manufactured at a relatively low cost. Another object of this invention is to provide a new and novel tubular brush of thermoplastic material having a brush tube made up of split tubular sections adhered to one another.

BRIEF DESCRIPTION OF THE DRAWINGS

FIG. 8 is a perspective view of a brush tube of the third embodiment of the invention;

FIG. 9 is a cross sectional view of the brush tube of FIG. 8 prior to the tube sections being joined with the relative thickness of the inner and outer skins in relation to the center portion being exaggerated; and FIG. 10 is an end view of the tube sections of FIG. 9 illustrating said sections being joined.

Referring to FIGS. 1–5, the tubular brush, generally designated 10, includes a tube 11 having a plurality of holes 12 in which tufts 13 are secured by staples 14. The tube is made of a rigid foam thermoplastic material, for example polypropylene, polyethylene, polyvinyl chloride, polymethylmethacrylate, and etc. For most purposes the tubes are of a greater length than the brush diameter (DIA).

Figure 1:
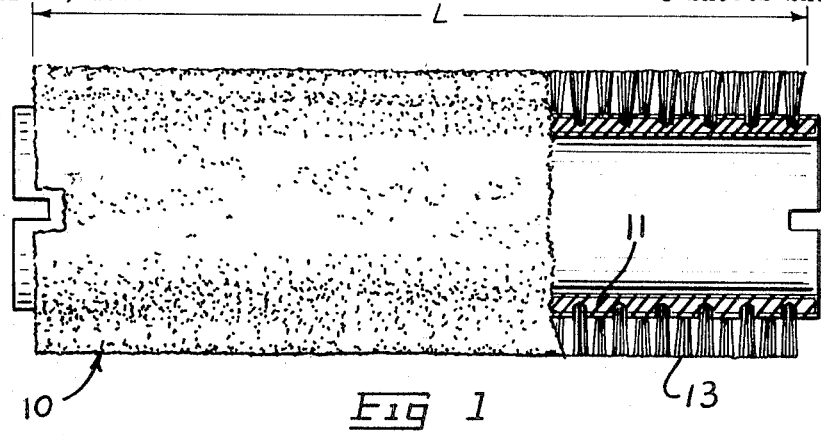
FIG. 1 is a side elevational view, partly sectioned along a longitudinal axis, of a representative tubular brush of this invention.
Figure 2:
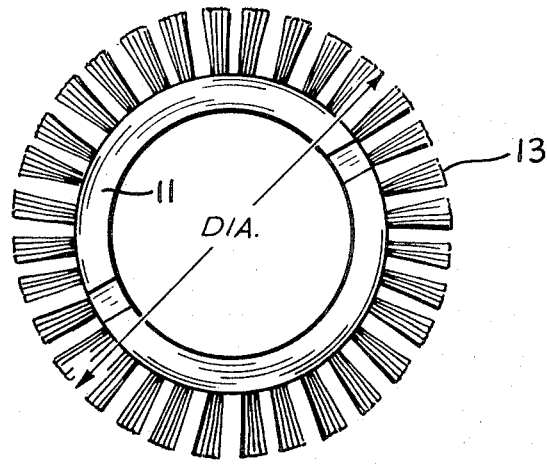
FIG. 2 is an end view of the brush of FIG. 1.
Figure 3:
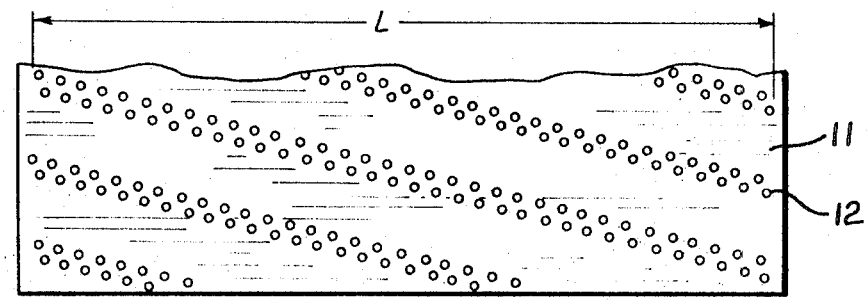
FIG. 3 is a fragmentary representation of the brush tube as though the tube were cut longitudinally and flattened, this view illustrating the outer surface of the brush tube after drilling and before tufting to show an exemplary pattern of location of tuft holes.

The entire tube is made of the same material, howevr, the density of the material through a cross section thereof varies. That is, the tube has an annular outer skin (layer) 15a, an annular inner skin (layer) 15b, edge skins 15c, and an annular foam central portion (layer) 15e bounded by skins 15a, 15b, 15c. The skins are relatively free of cells while the central layer is composed of closed cells. The density of the skins is about the same as that of polymer from which the tube is made in a non-expanded state, while the central portion 15e is cellular and of a substantially lower density. The density of the central layer is about 50% to 70% of the skin density. Due to the thicknesses of the skins and central layer 15e, and the relative densities, the overall density of the tube is about half of the density of the polymer in a non-expanded state.

Provided in the tube throughout the length L are the plurality of drilled holes 12, the pattern of the holes and the hole depths (HD) being similar to that disclosed in U.S. Pat. 2,879,534. However it is to be mentioned that holes may be drilled closer to the edges of the tubes of this invention than that which is practical with brushes of said patent due to the skins being of a stronger construction adjacent the edges. The holes are drilled through the outer skin and substantially all the way through the central portion other than for holes at edge portions 15c, and permissibly just into the inner skin. However it is preferable the holes are not drilled into the inner skin so as to leave adequate support for anchoring the tufts 13 in the tubes. Also, for the preceding reasons, it is desirable that the holes have a shallow conical bottom.

A tube thickness TT of about ½ inch to ⅝ inch is satisfactory in most instances for a brush for scrubbing and sweeping purposes; although for larger diameter brushes and heavy duty brushes, the thickness may be increased to ¾ inch to 1.0 inch or more. The hole depth HD is always less than the tube thickness to leave a underhole thickness UHT of a substantial dimension. Although the skin thickness (including dimension UHT) will vary with different size brushes, desirably it should be of a minimum of ¹⁄₄₀ inch to ¹⁄₁₆ inch.

The hole depth is greater than the diameter of the hole, provided the holes are circular. The hole diameter preferably is approximately ⅔ of the tube thickness TT.

Figures 4, 5:
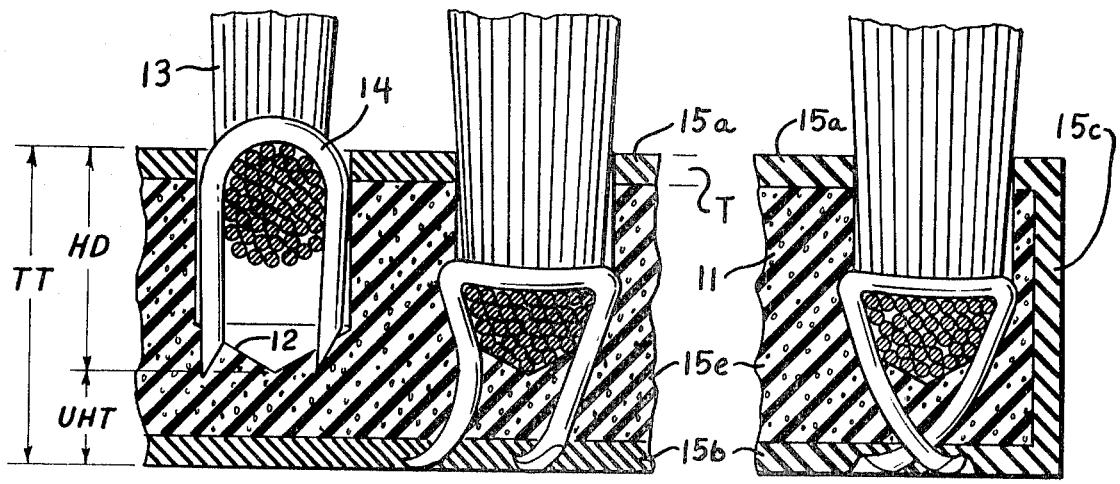
FIG. 4 is an enlarged fragmentary sectional view, longitudinally through the brush tube and illustrating exemplary tufts while the brush tube is on the stapling mandrel, this view illustrating the base portion of one tuft and staple during the process of being placed and illustrating another tuft when tuft and staple are secured.
FIG. 5 is an enlarged fragmentary longitudinal sectional view of one end portion of the brush tube.

The tufts 13 are made of bristle material suitable for the work to be done. Examples of suitable bristle material are set forth in U.S. Pat. 2,879,534. Further the staples 14 for retaining (anchoring) the tufts in the holes and the manner of setting the staples is set forth in the above mentioned patent. It is to be mentioned that the clinching of the staples may be either within the inner skin 15b as illustrated in FIG. 4 or completely through the skin 15b (see FIG. 5).

Advantages of the brush of this invention over prior art brushes, for example those made in accordance with the teaching of U.S. Pat. 2,879,534 are as follows:

(1) Reduced weight—As one example, with the same size brushes to do the same type of cleaning, the brush of this invention weighed about 8.5 lbs. while the impregnated paper brush weighed about 14 lbs.

(2) Appearance—Impregnated paper brushes for scrubbing are impregnated with black pitch which is unsightly.

(3) Dimensional stability—Impregnated paper brushes subject to moisture are relatively dimensionally unstable, for example a brush that is normally 42" long can easily have an increase of length of ½ inch.

(4) Resistance to moisture.

(5) Resistance to many chemicals.

(6) Good stapling and drilling characteristics—the foamed plastic is less abrasive than the impregnated paper and provides better support for the tufts.

(7) Reduced cost.

(8) Impact resistance.

(9) Shipping and storage characteristics.

Figure 6:
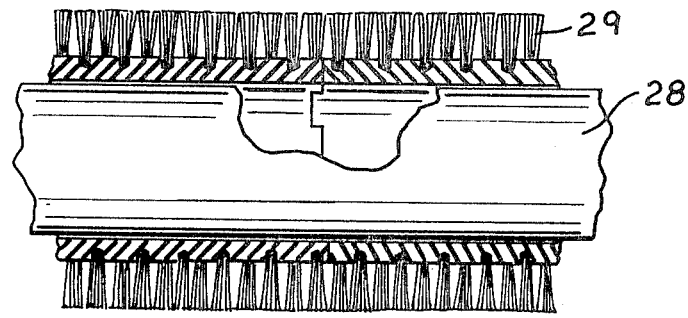
FIG. 6 illustrates a second embodiment of the invention wherein there is shown a fragmentary longitudinal section view of two tubular brushes mounted on a mandrel, a portion of the mandrel being broken away to show the interlocking between the brushes.
Figure 7:
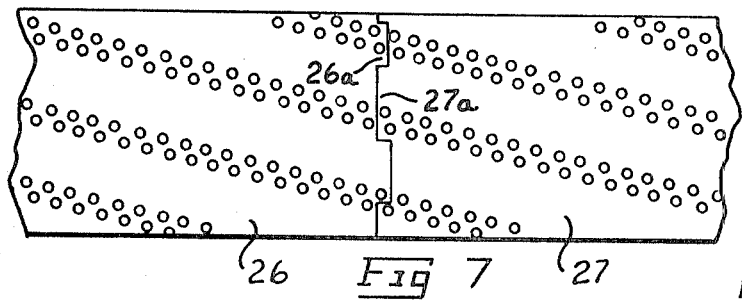
FIG. 7 is a view similar to that of FIG. 3 other than it shows the interlocking feature of the two brushes of FIG. 6.

In some operations it is desirable to have the width or surface cleaned in a single pass over the surface to be cleaned substantially greater than the length of a single brush that can be made economically. Accordingly the brushes of FIGS. 6 and 7 have been made. The brushes of FIGS. 6 and 7 are of the same construction as those of FIGS. 1–5 except for the differences noted. In the event two brushes 26, 27 are to be used then the adjacent ends of the tubes thereof are provided with radially spaced, axially extending protrusions 26a, 27a. The protrusions on one tube are offset from those on the other tube so as to intermesh and provide an unbroken array of tufts 29 across the length of the two brushes. Advantageously the brushes 26, 27 are mounted on a mandrel 28.

If more than two brushes are to be mounted in axial alignment then each pair of adjacent ends of the brushes would be provided with such protrusions.

Referring now to FIGS. 8–10, the third embodiment of the invention is made up of two half sections respectively designated 41 and 42, the sections being made of the same material as the tube of FIGS. 1–5. Since both sections are of the same construction primarily only one section will be described. The section 42 includes a semi-annular, outer skin portion 43, an inner skin portion 44, longitudinal edge skin portions 45 and 46, skin end portions 47 and a central portion 48 that is enclosed by portions 43–47.

The two half sections are joined together, i.e. the two sections are heat welded together to form the tube. Heat is applied to the longitudinal edge surfaces of the half sections which mate in bounded relationship to form the completed tube. This may be accomplished by placing the half sections over electrodes 50 on either side contacting the surfaces to be mated. The electrodes are removed as the surfaces of portions 45 and 46 reach the appropriate temperature and then the half sections are moved to move the axial edge surfaces of portions 45 and 46 of one section into mating contacting with the axial edge surfaces of portions 46 and 45 respectively of the other section. Advantageously the mating surface portions may be offset, grooved or doweled to provide absolute positioning and additional mating surface areas.

After the sections are joined together, the thus formed tube is provided with tufts holes 51 and tufts are stapled in the holes in the manner described with reference to FIGS. 1–5.

As one example of the invention, a tube 11 has an inside diameter of 4.040 inches, an outside diameter of 4.925 inches, and a skin thickness for each of skins 15a, 15b that varies from .025 to .060 inch. The mean density of the example near the center portion of layer 15e was about 60% of the density near the external surfaces of the skins 15a, 15b. The ratios of skin thickness T to tube thickness TT varied from .056 to .136.

For a tube having a thickness TT of ½ inch, the ratio of skin thickness to tube thickness TT would be in the range of .025 to .060 while a tube having a thickness of ¾ inch, the ratio of skin thickness to tube thickness would be in the range of .033 to .080.

What is claimed is:

1. A tubular brush comprising a tube of a foamed, thermoplastic material having inner and outer skins of substantial thicknesses and a central layer, said inner and outer skins having substantially greater densities than the central layer, said central layer being of a cellular construction, said tube having a plurality of tuft holes extending through the outer skin and at least substantially through the central layer, tufts in said holes and means for securing the tufts to the inner skin.

2. The tubular brush of claim 1 further characterized in that said means comprises staples extending into the inner skin.

3. The tubular brush of claim 2 further characterized in that the inner skin is of a thickness of at least $\frac{1}{40}$ inch.

4. The tubular brush of claim 2 further characterized in that the holes are of depths that are greater than other diameters thereof.

5. The tubular brush of claim 1 further characterized in that the tube has a tube thickness of a minimum of about ½ inch and that the ratio of skin thickness to tube thickness is at least .025.

6. The tubular brush of claim 5 further characterized in that the tuft hole diameter is approximately $\frac{2}{3}$ of the tube thickness.

7. The tubular brush of claim 5 further characterized in that the density of the center layer is in the range of about 50% to 70% of the skin density.

8. The tubular brush of claim 7 further characterized in that the length of the tube is greater than the diameter thereof.

9. The tubular brush of claim 8 further characterized in that the tube comprises longitudinal sections having adjacent longitudinal edges joined together.

10. The tubular brush of claim 8 further characterized in that the tube is of a unitary construction.

11. A rotary tubular brush for power sweepers, polishers, scarifiers and the like comprising a cylindrical tube of a unitary construction, said tube being made of a foamed thermoplastic material and having an inner generally annular skin, an outer, generally annular skin, and a central, generally annular portion between said skins, the density of the skins being about the same as said material in a non-expanded state, and the density of the central layer being substantially less than that of the skins, the inner skin being of a thickness of at least $\frac{1}{40}$ inch, said tube having a plurality of tuft holes extending through the outer skin and at least partially through the central layer, bristles extending in said tuft holes, and staples extending at least partially through the inner skin for securing the bristles in the tuft holes.

12. The tubular brush of claim 11 further characterized in that the ratio of the density of the central annular portion to the skin density is in the range of about 50% to 70%, and that the tube has a tube thickness of a minimum of about ½ inch.

13. The tubular brush of claim 12 further characterized in that the diameters of the tuft holes are less than the depths of said holes and that the hole diameter is approximately $\frac{2}{3}$ of the tube thickness.

14. The tubular brush of claim 12 further characterized in that the ratio of skin thickness of each of the inner and outer skins to tube thickness is in a range of about .025 to .080.

15. The tubular brush of claim 12 further characterized in that the inner and outer skins are of substantially the same thickness and density.

References Cited

UNITED STATES PATENTS

| | | | |
|---|---|---|---|
| 2,575,635 | 11/1951 | Meyers et al. | 15—181 |
| 2,879,534 | 3/1959 | Swanson et al. | 15—182 X |
| 3,118,161 | 1/1964 | Cramton | 15—179 X |
| 3,160,163 | 12/1964 | Bolinger | 15—114 X |
| 3,329,986 | 7/1967 | Hackworth | 15—179 |
| 3,355,758 | 12/1967 | Clark | 15—181 |

FOREIGN PATENTS

| | | | |
|---|---|---|---|
| 1,927,150 | 3/1970 | Germany | 15—179 |

PETER FELDMAN, Primary Examiner